United States Patent [19]

Benoist et al.

[11] Patent Number: 5,244,755
[45] Date of Patent: Sep. 14, 1993

[54] BATTERY COMPARTMENT DOOR AND LATCH HAVING LONGITUDINAL SNAPS

[75] Inventors: William B. Benoist, Lake Worth; Dwight D. Brooks, Boynton Beach; Russell A. Strobel, Boca Raton, all of Fla.

[73] Assignee: Motorola, Inc., Schaumburg, Ill.

[21] Appl. No.: 966,015

[22] Filed: Oct. 23, 1992

[51] Int. Cl.⁵ ............................................ H01M 2/10
[52] U.S. Cl. .................................. 429/97; 429/100; 455/90; 455/347; 220/346
[58] Field of Search .................... 429/96, 97, 99, 100, 429/123; 206/333; 220/346; 361/392, 394; 364/708; 365/229, 226; 455/90, 347, 349

[56] References Cited

U.S. PATENT DOCUMENTS

| | | | |
|---|---|---|---|
| 4,390,198 | 6/1983 | Selinko | 292/152 |
| 4,391,883 | 7/1983 | Williamson et al. | 429/97 |
| 4,641,370 | 2/1987 | Oyamada | 455/348 |
| 4,880,712 | 11/1989 | Gordecki | 429/97 |
| 4,904,549 | 2/1990 | Goodwin et al. | 429/97 |
| 4,972,508 | 11/1990 | King | 455/347 X |

*Primary Examiner*—Anthony Skapars
*Attorney, Agent, or Firm*—Robert Louis Breeden; William E. Koch; Thomas G. Berry

[57] ABSTRACT

A housing (202, 602) for an electronic device (700) comprises a battery compartment door (604) having a one-piece molded latch (100). The latch (100) comprises a slide member (102) coupled to a snap member (104) formed substantially in the shape of a U. The snap member (104) comprises a mounting end (106) forming the bottom of the U, and two snap arms (108) forming the two sides of the U. The snap member (104) is supported at a distance from the slide member (102), the distance being sufficient to clear walls of the housing (202). The latch (100) further comprises a header block (112) coupled to the slide member (102) between the two snap arms (108) for minimizing deflection of the two snap arms (108) towards the slide member (102) during assembly of the latch (100).

13 Claims, 4 Drawing Sheets

BATTERY COMPARTMENT DOOR AND LATCH HAVING LONGITUDINAL SNAPS

FIELD OF THE INVENTION

This invention relates in general to housings for electronic devices, and more specifically to a housing having a battery compartment door and a latch coupled to the battery compartment door for latching the battery compartment door closed.

BACKGROUND OF THE INVENTION

Housings for electronic devices having battery compartment doors and latches therefor are well-known in the art. In portable electronic devices in which there has been a trend of decreasing physical size, designers are being challenged to miniaturize all housing components.

Smaller latches have presented a problem in that conventional latch structures have employed flexible snaps and detents to position the latch in one of two positions (latched or unlatched). The flexible snaps of these conventional structures have used snap arms normal to the direction of movement of the latch. To reduce the amount of space required for such a conventional latch it would be necessary to shorten the length of the snap arms. Shortening the length of the snap arms, however, would require increased deflection per unit length of the snap arms, thus possibly over-stressing the snap arms and leading to their permanent deformation. Smaller latches also can present a difficulty during assembly, because the small size makes it harder for a human assembler to see, and thus easy for the assembler to insert backwards.

Thus, what is needed is a way of reducing the space required for the latch for the battery compartment door. A way is needed that will not over-stress the snap arms. A latch is also needed that eliminates the opportunity for backwards insertion during assembly.

SUMMARY OF THE INVENTION

One aspect of the present invention is a housing for an electronic device, the housing comprising a battery compartment door and a one-piece molded latch coupled to the battery compartment door for latching the battery compartment door closed. The one-piece molded latch comprises a snap member formed substantially in the shape of a U, and a slide member. The snap member comprises a mounting end substantially inclusive of the bottom of the U and two snap arms substantially inclusive of the two sides of the U. The one-piece molded latch further comprises a cantilever coupled between the slide member and the mounting end of the snap member for supporting the snap member at a distance from the slide member, the distance being sufficient to clear walls of the housing. The one-piece molded latch further comprises a header block coupled to the slide member between the two snap arms and having a surface spanning substantially parallel to a major surface of the slide member and substantially coplanar with surfaces of the two snap arms for minimizing deflection of the two snap arms towards the slide member during assembly of the one-piece molded latch.

Another aspect of the present invention is a selective call receiver, comprising user controls for controlling operation of the selective call receiver and a display coupled to the user controls for displaying received information. The selective call receiver further comprises an alert device coupled to the user controls for generating an alert in response to receiving information addressed to the selective call receiver, and a housing comprising a first housing section and a second housing section coupled to the first housing section for housing the user controls, display, and alert generator. The housing further comprises a battery compartment door coupled to the first and second housing sections to form a battery compartment and a one-piece molded latch coupled to the battery compartment door for latching the battery compartment door closed. The one piece molded latch comprises a snap member formed substantially in the shape of a U, and a slide member. The snap member comprises a mounting end substantially inclusive of the bottom of the U and two snap arms substantially inclusive of the two sides of the U. The one-piece molded latch further comprises a cantilever coupled between the slide member and the mounting end of the snap member for supporting the snap member at a distance from the slide member, the distance being sufficient to clear walls of the housing. The one-piece molded latch further comprises a header block coupled to the slide member between the two snap arms and having a surface spanning substantially parallel to a major surface of the slide member and substantially coplanar with surfaces of the two snap arms for minimizing deflection of the two snap arms towards the slide member during assembly of the one-piece molded latch.

DESCRIPTION OF THE PREFERRED EMBODIMENT

Figure 1:
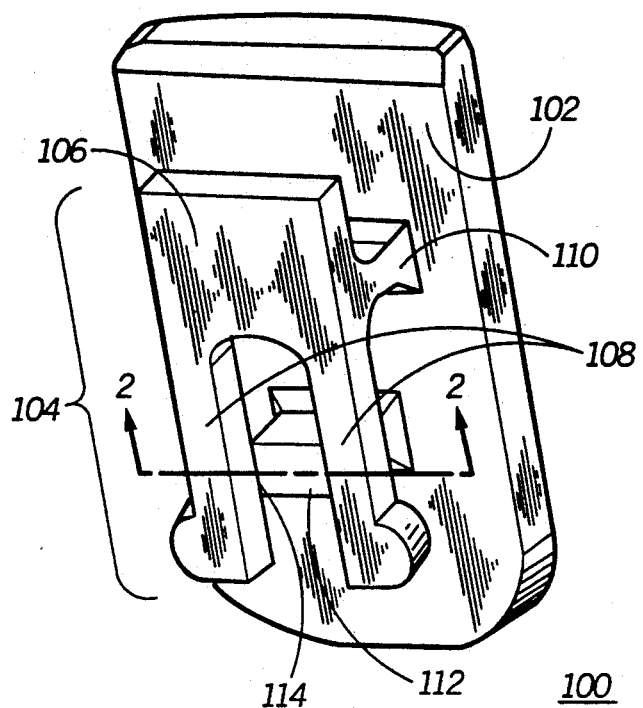
FIG. 1 is an isometric view of a one-piece molded latch in accordance with the preferred embodiment of the present invention.

Referring to FIG. 1, an isometric view of a one-piece molded latch 100 in accordance with the preferred embodiment of the present invention depicts a slide member 102 coupled to a snap member 104 having a U-shaped geometry. The snap member 104 comprises a mounting end 106 and two snap arms 108. The mounting end 106 is coupled to the slide member 102 by a cantilever 110, which supports the snap member 104 at a distance from the slide member 102, the distance being sufficient to clear walls of a mating housing section 202 (FIG. 3) after assembly. A header block 112 is coupled to the slide member 102 between and behind the two snap arms 108. The surface of the header block 112 closest to the two snap arms 108 is substantially coplanar with the corresponding closest surfaces of the two snap arms 108.

Figure 3:
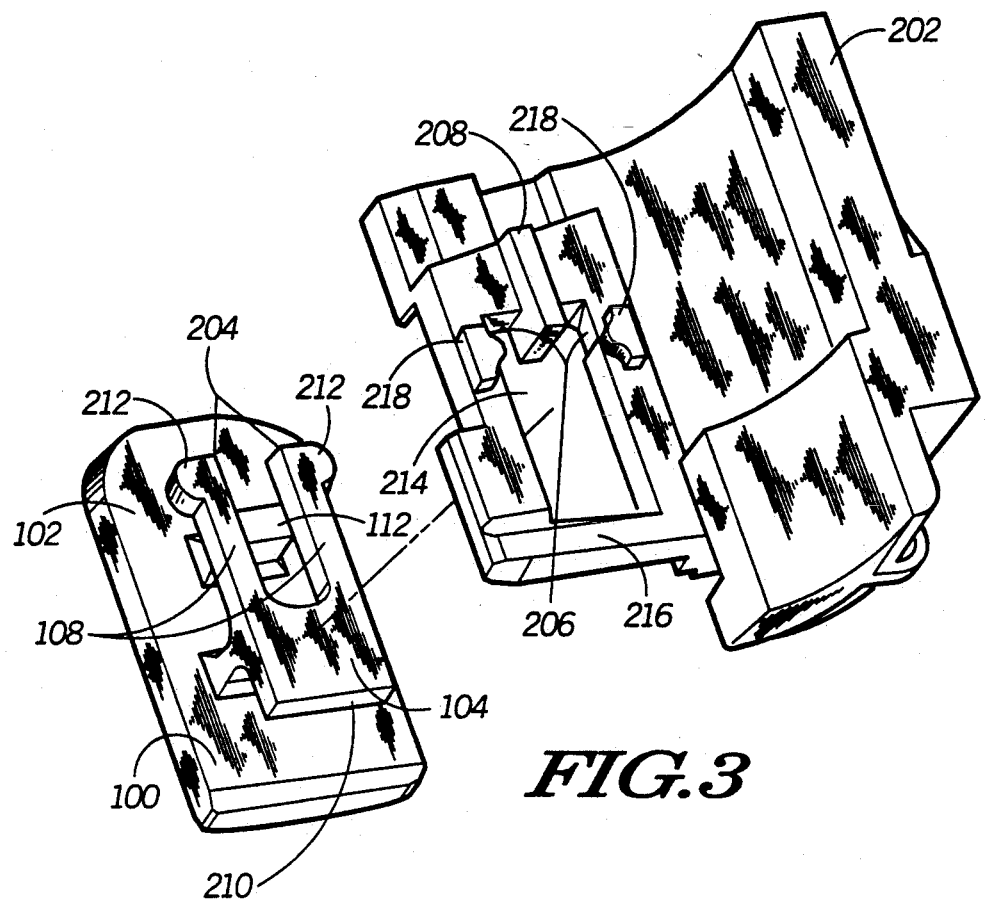
FIG. 3 is an isometric view of the one-piece molded latch about to be assembled correctly into a mating housing section in accordance with the preferred embodiment of the present invention.

The purpose of the header block 112 is to prevent the two snap arms 108 from deflecting towards the slide member during assembly of the one piece molded latch 100 to the mating housing section 202 (FIG. 3). A slight overlap of the surfaces of the header block 112 and the two snap arms 108 exists at the edge 114 and at a corresponding edge on the opposite side of the header block 112, the corresponding edge not visible in FIG. 1. Material used to construct the one-piece molded latch 100 is preferably nylon, although other moldable plastic materials could be used as well without departing from the intent of the present invention.

Figure 2:
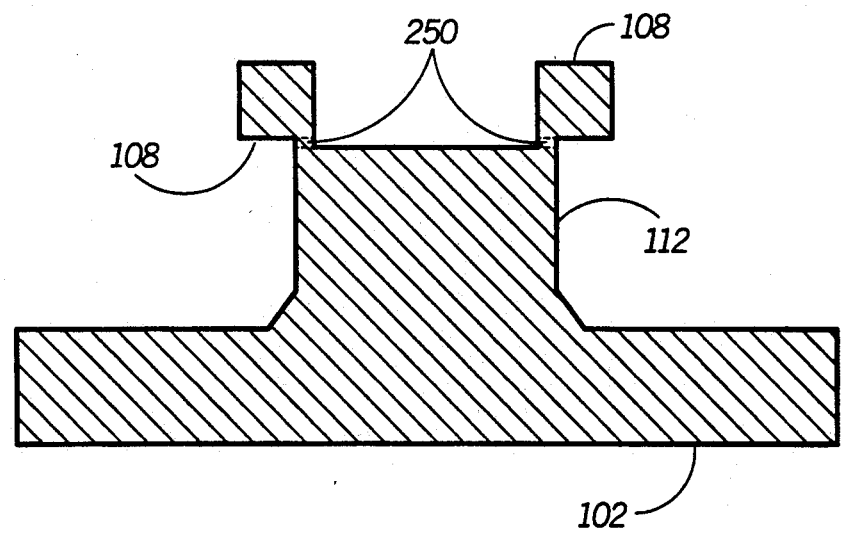
FIG. 2 is an orthographic cross-section view of the one-piece molded latch taken along the line 2—2 of FIG. 1 through the center of a header block in accordance with the preferred embodiment of the present invention.

Referring to FIG. 2, an orthographic cross-section view of the one-piece molded latch 100 along the line 2—2 of FIG. 1 through the center of the header block 112 in accordance with the preferred embodiment of the present invention shows that before assembly of the one-piece molded latch 100 to the mating housing section 202 (FIG. 3), the two slight overlaps comprise two thin webs 250 of contiguous molded material coupling the two snap arms 108 to the header block 112. As will be explained herein below, assembling the one-piece molded latch 100 to the mating housing section 202 produces forces such that the two snap arms 108 are momentarily deflected toward one another, severing the two thin webs 250 of contiguous molded material, thus decoupling the two snap arms 108 from the header block 112 after assembly.

Referring to FIG. 3, an isometric view of the one-piece molded latch 100 about to be assembled correctly into the mating housing section 202 in accordance with the preferred embodiment of the present invention shows an assembly guide block 208 coupled to the mating housing section 202. When the one-piece molded latch 100 is oriented correctly, as shown in FIG. 3, after assembly to the mating housing section 202 the assembly guide block 208 will fit within the aperture 204 between the two snap arms 108, and thus will not interfere with the one-piece molded latch 100.

To assemble the one-piece molded latch 100 to the mating housing section 202, the bottom end 210 of the snap member 104 is inserted through the assembly aperture 214 and hooked over a bottom aperture surround 216. Then the top end of the one-piece molded latch 100 is rotated towards the assembly aperture 214, until the two protruding ends 212 of the two snap arms 108 enter two chamfered groves 206 positioned on either side of the assembly aperture 214. As the one-piece molded latch 100 is rotated further into the assembly aperture 214, the two protruding ends 212 of the two snap arms 108 are forced towards one another by the walls of the two chamfered groves 206, thus deflecting the two snap arms 108 towards one another and severing the two thin bands of contiguous molded material that coupled the two snap arms 108 to the header block 112 before assembly, as described herein above.

As also described herein above, the header block 112 prevents the two snap arms 108 from being deflected toward the slide member 102 during assembly. Once the two protruding ends 212 of the two snap arms 108 have been rotated sufficiently into the two chamfered groves 206 to clear the walls of the assembly aperture 214, elastic restoring forces in the two snap arms 108 cause the two protruding ends 212 to snap outwards beyond the edges of the assembly aperture 214, coming to rest against the two snap cams 218. This locks the one-piece molded latch 100 within the mating housing section 202, completing the assembly.

Figure 4:
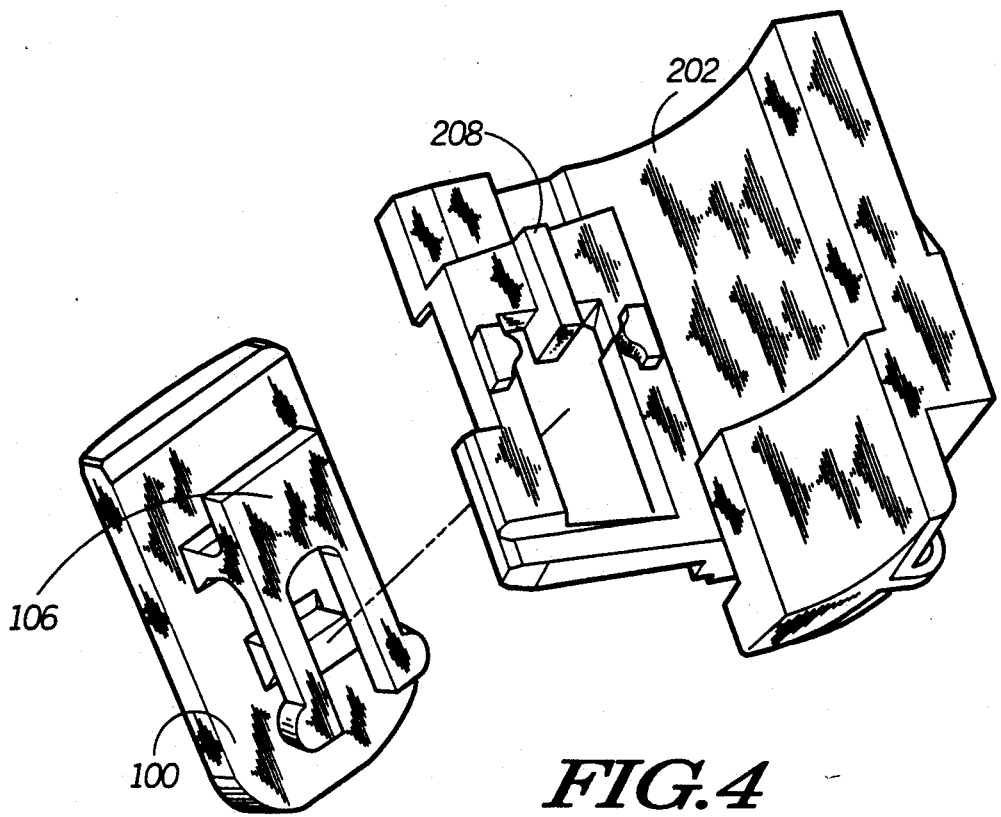
FIG. 4 is an isometric view of the one-piece molded latch about to be assembled incorrectly into the mating housing section in accordance with the preferred embodiment of the present invention.
Figure 5:
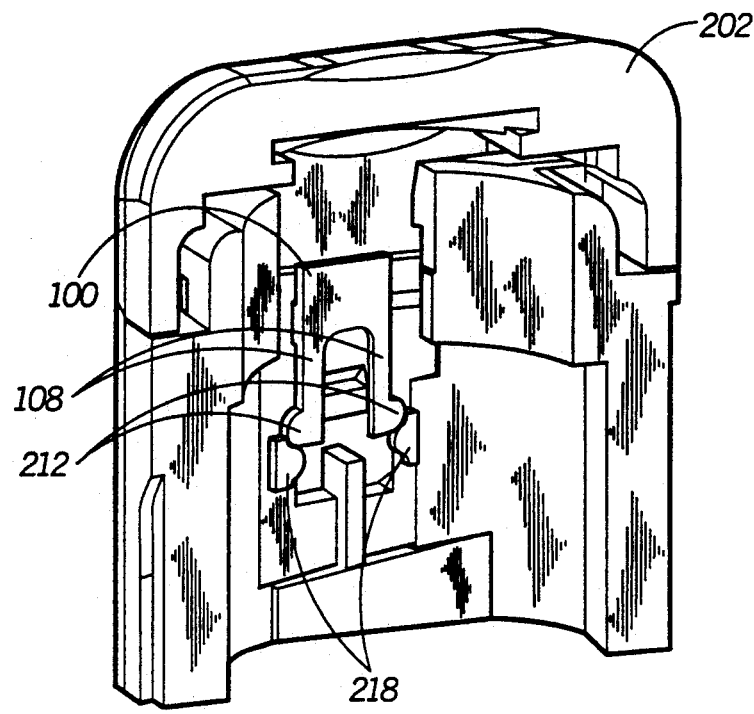
FIG. 5 is an isometric view of the one-piece molded latch shown in latched position within the mating housing section in accordance with the preferred embodiment of the present invention.

Referring to FIG. 4 an isometric view of the one-piece molded latch 100 about to be assembled incorrectly into the mating housing section 202 in accordance with the preferred embodiment of the present invention shows the mounting end 106 of the snap member 104. The mounting end 106 will interfere with the assembly guide block 208 if assembly of the one piece molded latch 100 is attempted with the one-piece molded latch 100 oriented incorrectly as shown. The interference of the mounting end 106 and the assembly guide block 208 thus advantageously prevents assembly with an incorrect orientation. Referring to FIG. 5, an isometric view shows the one-piece molded latch 100 fully assembled into the mating housing section 202 and in a latched position (as is fully explained herein below) in accordance with the preferred embodiment of the present invention. Note that in the latched position the two protruding ends 212 of the two snap arms 108 are proximate the upper sides of the two snap cams 218.

Figure 6:
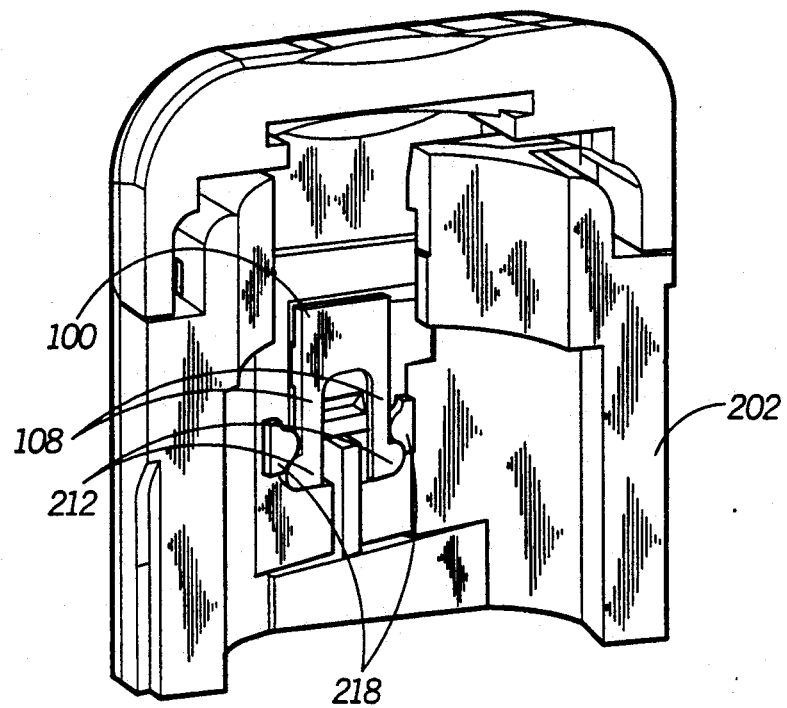
FIG. 6 is an isometric view of the one-piece molded latch shown in unlatched position within the mating housing section in accordance with the preferred embodiment of the present invention.

Referring to FIG. 6, an isometric view shows the one-piece molded latch 100 fully assembled into the mating housing section 202 and in an unlatched position in accordance with the preferred embodiment of the present invention. Note that in the unlatched position the two protruding ends 212 of the two snap arms 108 are proximate the lower sides of the two snap cams 218. The function of the two snap cams 218 in conjunction with the two snap arms 108 is to provide two mechanically stable positions (latched and unlatched) for the one-piece molded latch 100. Between the two stable positions, the elastic restoring forces produced by deflection of the two snap arms 108 between the two snap cams 218, in conjunction with the geometry of the two snap cams 218 and the two protruding ends 212, tends to move the one-piece molded latch 100 to the closer of the two mechanically stable positions. The orientation of the two snap arms 108 parallel to the slide member 102 (FIG. 1) advantageously reduces the space required within the mating housing section 202 by the one-piece molded latch 100 compared to the space that would be required by a conventional snap latch.

Figure 7:
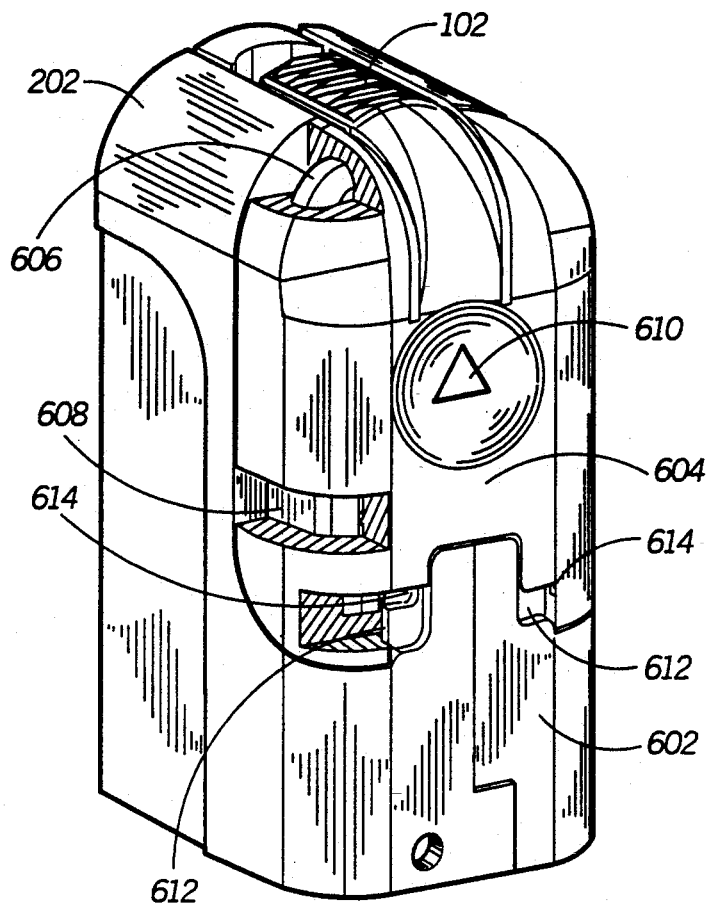
FIG. 7 is an isometric view of a portion of a selective call receiver detailing the one-piece molded latch and a battery compartment door in accordance with the preferred embodiment of the present invention.

Referring to FIG. 7, an isometric view of a portion of a selective call receiver 700 (FIG. 8) detailing the one-piece molded latch 100 and a battery compartment door 604 in accordance with the preferred embodiment of the present invention shows the mating housing section 202 assembled to a complementary housing section 602. Also shown is an outer surface of the slide member 102 of the one-piece molded latch 100 (FIG. 1) in the latched position over the battery compartment door 604. As shown by the uppermost cut-away view, the battery compartment door 604 overlaps a rail 606 of the mating housing section 202. To open the battery compartment door 604, it is necessary to slide the battery compartment door 604 upwards in the direction of arrow 610 far enough for the battery compartment door 604 to clear the rail 606. Two bosses 612 within two chambers 614 prevent the battery compartment door 604 from being completely removed from the mating housing section 202, while allowing the battery compartment door 604 to slide upwards and then to be rotated outwards about the bosses 612, which act as a hinge.

When the slide member 102 of the one-piece molded latch 100 (FIG. 1) is in the latched position as shown, the slide member 102 interferes with sliding movement of the battery compartment door 604, thus preventing the battery compartment door 604 from being opened. When the slide member 102 of the one-piece molded latch 100 is moved away from the battery compartment door 604, i.e., into the unlatched position shown in FIG. 6, then the slide member 102 does not interfere with the battery compartment door 604, thus allowing the battery compartment door 604 to be opened. Material used to construct the mating housing section 202, the complementary housing section 602, and the battery compartment door 604 is preferably a polycarbonate plastic, although other moldable plastic materials could be used as well without departing from the intent of the present invention.

An additional feature of the battery compartment door 604 is that the battery compartment door 604 overlaps a shelf 608 of the mating housing section 202. The battery compartment door 604 also overlaps a corresponding shelf (not shown) of the complementary housing section 602. The effect of this overlap is that the battery compartment door 604 prevents disassembly of the mating housing section 202 from the complementary housing section 602 when the battery compartment door is closed. This advantageously makes the selective call receiver 700 (FIG. 8) more resistant to inadvertent disassembly as a result of an accidental drop.

Figure 8:
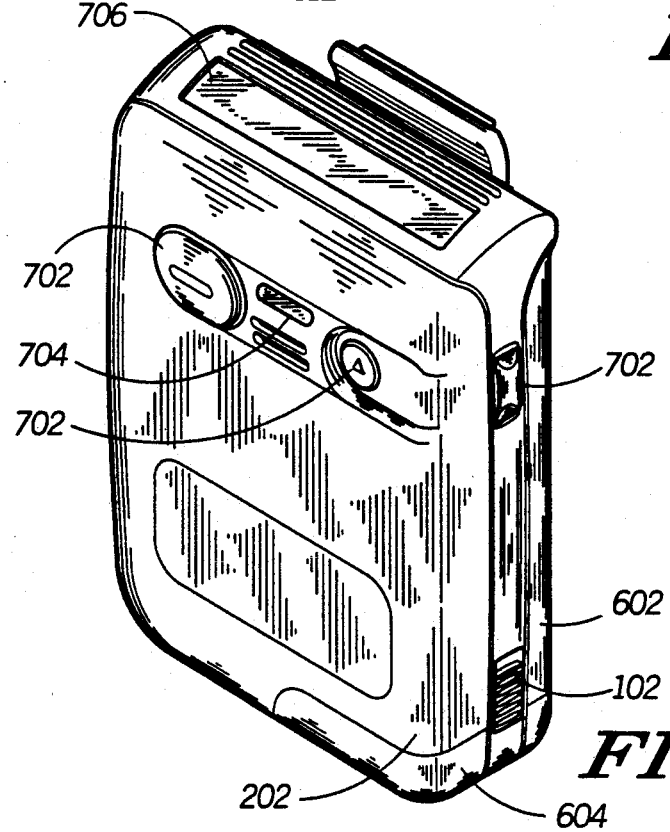
FIG. 8 is an isometric view of a selective call receiver in accordance with the preferred embodiment of the present invention.

Referring to FIG. 8, an isometric view of the selective call receiver 700 in accordance with the preferred embodiment of the present invention depicts user controls 702 for allowing a user to control selective call receiver functions, and an alert device, such as an audio transducer (not shown), positioned behind port 704 for alerting the user whenever the selective call receiver has received a message. Also depicted is a display 706, e.g., an LCD, for displaying received messages. The user controls 702, the alert device behind port 704, and the display 706 are all well-known to one of ordinary skill in the art.

In accordance with the preferred embodiment of the present invention, the selective call receiver 700 also comprises the slide member 102 of the one-piece molded latch 100 (FIG. 1) and the mating housing section 202. The selective call receiver 700 further comprises the complementary housing section 602 and the battery compartment door 604 in accordance with the preferred embodiment of the present invention.

Thus, the present invention provides a way of reducing the space required for a latch for a battery compartment door. By constructing snap arms that deflect in a plane parallel to the direction of movement of the latch, the present invention allows the snap arms to be long enough to prevent over-stressing the arms, while minimizing the space required for the arms. The present invention also advantageously minimizes the opportunity for backwards insertion during assembly of the latch and housing, and helps prevent inadvertent disassembly during an accidental drop.

What is claimed is:

1. A housing for an electronic device, the housing comprising:
   a battery compartment door; and
   a one piece molded latch coupled to the battery compartment door for latching the battery compartment door closed, wherein the one piece molded latch comprises:
   a slide member;
   a snap member formed substantially in the shape of a U, the snap member comprising a mounting end substantially inclusive of the bottom of the U and two snap arms substantially inclusive of the two sides of the U;
   a cantilever coupled between the slide member and the mounting end of the snap member for supporting the snap member at a distance from the slide member, the distance being sufficient to clear walls of the housing; and
   a header block coupled to the slide member between the two snap arms and having a surface spanning substantially parallel to a major surface of the slide member and substantially coplanar with surfaces of the two snap arms for minimizing deflection of the two snap arms towards the slide member during assembly of the one-piece molded latch.

2. The housing in accordance with claim 1,
   wherein edges of the header block and corresponding edges of the two snap arms overlap and are joined by a web of material formed contiguously therebetween, and
   wherein the overlapping, joined edges of the header block and the two snap arms become separated by forces applied during the assembly of the one-piece molded latch into the housing, the forces being in a direction that causes the two snap arms to deflect towards each other.

3. The housing in accordance with claim 1, further comprising an assembly guide block molded into the housing,
   wherein the assembly guide block fits within space between the two snap arms, the one piece molded latch being assembled in a correct direction, and
   wherein the assembly guide block interferes with the mounting end of the snap member, an attempt being made to assemble the one-piece molded latch in an incorrect direction.

4. The housing in accordance with claim 1, wherein the battery compartment door has a geometry such that elements of the battery compartment door overlap elements of assembled first and second housing sections, thus preventing disassembly of the first and second housing sections when the battery compartment door is closed.

5. The housing in accordance with claim 1, wherein the battery compartment door is constructed of a polycarbonate plastic.

6. The housing in accordance with claim 1, wherein the one-piece molded latch is constructed of nylon.

7. A selective call receiver, comprising:
   user controls for controlling operation of the selective call receiver;
   a display coupled to the user controls for displaying received information;

an alert device coupled to the user controls for generating an alert in response to receiving information addressed to the selective call receiver; and a housing, comprising:

a first housing section;

a second housing section coupled to the first housing section for enclosing and protecting the user controls, display, and alert generator;

a battery compartment door coupled to the first and second housing sections to form a battery compartment; and a one-piece molded latch coupled to the battery compartment door for latching the battery compartment door closed, wherein the one-piece molded latch comprises:

a slide member;

a snap member formed substantially in the shape of a U, the snap member comprising a mounting end substantially inclusive of the bottom of the U and two snap arms substantially inclusive of the two sides of the U;

a cantilever coupled between the slide member and the mounting end of the snap member for supporting the snap member at a distance from the slide member, the distance being sufficient to clear walls of the housing; and a header block coupled to the slide member between the two snap arms and having a surface spanning substantially parallel to a major surface of the slide member and substantially coplanar with surfaces of the two snap arms for minimizing deflection of the two snap arms towards the slide member during assembly of the one-piece molded latch.

8. The selective call receiver in accordance with claim 7, wherein edges of the header block and corresponding edges of the two snap arms overlap and are joined by a web of material formed contiguously therebetween, and wherein the overlapping, joined edges of the header block and the two snap arms become separated by forces applied during the assembly of the one piece molded latch into the housing, the forces being in a direction that causes the two snap arms to deflect towards each other.

9. The selective call receiver in accordance with claim 7, further comprising an assembly guide block molded into the first housing section, wherein the assembly guide block fits within space between the two snap arms, the one-piece molded latch being assembled in a correct direction, and wherein the assembly guide block interferes with the mounting end of the snap member, an attempt being made to assemble the one-piece molded latch in an incorrect direction.

10. The selective call receiver in accordance with claim 7, wherein the battery compartment door has a geometry such that elements of the battery compartment door overlap elements of the first and second housing sections, thus preventing disassembly of the first and second housing sections when the battery compartment door is closed.

11. The selective call receiver in accordance with claim 7, wherein the battery compartment door is constructed of a polycarbonate plastic.

12. The selective call receiver in accordance with claim 7, wherein the one-piece molded latch is constructed of nylon.

13. The selective call receiver in accordance with claim 7, wherein the first and second housing sections are constructed of a polycarbonate plastic.

* * * * *